(12) United States Patent
Verhaeghe et al.

(10) Patent No.: US 10,426,096 B2
(45) Date of Patent: Oct. 1, 2019

(54) PLUNGER AND PRE-COMPRESSION CHAMBER LINK

(71) Applicant: CNH Industrial America LLC, New Holland, PA (US)

(72) Inventors: Didier Verhaeghe, Ypres (BE); Filip Van Gaeveren, Hamme (BE)

(73) Assignee: CNH Industrial America LLC, New Holland, PA (US)

( * ) Notice: Subject to any disclaimer, the term of this patent is extended or adjusted under 35 U.S.C. 154(b) by 482 days.

(21) Appl. No.: 15/094,692

(22) Filed: Apr. 8, 2016

(65) Prior Publication Data

US 2016/0295805 A1    Oct. 13, 2016

(30) Foreign Application Priority Data

Apr. 10, 2015    (BE) .................................. 2015/5232

(51) Int. Cl.
  *A01F 15/10*    (2006.01)
  *A01F 15/08*    (2006.01)
(52) U.S. Cl.
  CPC ...... *A01F 15/0841* (2013.01); *A01F 15/0825* (2013.01); *A01F 15/101* (2013.01); *A01F 2015/102* (2013.01)

(58) Field of Classification Search
  CPC .... A01F 15/0841; A01F 15/101; A01F 15/10; A01F 15/042; A01F 15/0825; A01F 2015/102; A01F 15/04; F16H 1/28
  USPC ............... 100/216, 177, 188 R; 56/471, 434; 74/640
  See application file for complete search history.

(56) References Cited

U.S. PATENT DOCUMENTS 5,768,872 A * 6/1998 Von Allworden ..... A01D 90/02
100/189

FOREIGN PATENT DOCUMENTS

DE        19627397 A1    10/1997
WO    2015028524 A1     3/2015

* cited by examiner

*Primary Examiner* — Elaine Gort
*Assistant Examiner* — Christopher B Wehrly
(74) *Attorney, Agent, or Firm* — Peter K. Zacharia; Patrick M. Sheldrake

(57) ABSTRACT

An agricultural baler includes a baling chamber with a plunger that is provided to reciprocally move in the baling chamber. The baler further includes a pre-compression chamber with a slice pushing mechanism provided for periodically pushing a slice of crop material into the baling chamber. The plunger and the slice pushing mechanism are mechanically linked via respective driving systems to ensure synchronization, wherein a coupling is mounted in the mechanical link to adjust a synchronization timing.

18 Claims, 3 Drawing Sheets

PLUNGER AND PRE-COMPRESSION CHAMBER LINK

CROSS REFERENCE TO RELATED APPLICATION

This application claims priority to Belgium Application BE2015/5232, filed Apr. 10, 2015, the contents of which are incorporated herein by reference.

FIELD OF THE INVENTION

The present invention relates to an agricultural baler and, more specifically, to a square agricultural baler, which is provided for gathering crop material, forming slices of crop material from the gathered crop material, and pressing square bales from the slices.

BACKGROUND OF THE INVENTION

Agricultural balers typically comprise two main parts used in the formation of the bales: a pre-compression chamber and a baling chamber. Crop material is gathered and pushed into the pre-compression chamber, where a slice of crop material is formed. The pre-compression chamber is linked to the baling chamber in such a manner that the slice of crop material can periodically be transferred into the baling chamber. In the baling chamber, a plunger reciprocally moves, thereby pressing a square bale from subsequently fed slices.

The plunger movement is powered via a main shaft driven by a motor. The motor can be a part of the baler, or can be a part of e.g. the tractor connected to the baler via a power take-off (PTO). In practice, this reciprocal movement of the plunger is often considered the most dominant movement in the baler, dominant meaning that other movements are made relative to this movement of the plunger. The reason is that the plunger movement requires the highest force (highest relative to other forces needed for operating the baler). Of all movements in the baler, the movement of the plunger shows the highest inertia.

The pre-compression chamber is adapted for receiving gathered crop material. To this end, the pre-compression chamber shows an inlet. The pre-compression chamber furthermore shows an outlet towards the baling chamber. Between the inlet and the outlet, a channel is defined in which crop material can gather into a slice of crop material. The pre-compression chamber comprises a slice pushing mechanism provided for pushing a slice of crop material formed in the pre-compression chamber through the outlet of the pre-compression chamber into the baling chamber. The sliced crop material is typically pushed in a first segment of the baling chamber. The first segment is typically located directly behind the plunger (the plunger being in the withdrawn position). Thereby the slice of crop material is pushed in the baling chamber, after which the plunger can propel the crop material into the baling chamber, thereby pushing the most recently entered slice into the baling chamber, making it a part of the square bale.

The pre-compression chamber comprises, for the purpose of pushing the slice into the baling chamber, a slice pushing mechanism. Different types of slice pushing mechanisms are known, among which fingers grasping behind the slice and pushing the slice through the outlet, or a set of conveyer belts in between which the slice is formed, and which conveyer belts are driven to push the slice through the outlet.

The slice pushing mechanism is driven via a driving mechanism that is operationally linked to the plunger driving mechanism. A synchronized movement between the slice pushing mechanism and the plunger is needed to ensure a proper operation of the baler. Namely, only when the plunger is withdrawn, a slice can be pushed in the baling chamber. In practice, different synchronization types are possible among which a one/one synchronization, meaning that every withdrawal of the plunger a new slice is entered into the baling chamber, or a one/two synchronization, meaning that every other withdrawal of the plunger a new slice is entered, thus the plunger moves forth and back two times for each slice. Other synchronization timings, such as one/three, one/four, etc., are also possible.

Synchronization is in practice realized by mechanically linking the plunger driving mechanism and the slice pushing driving mechanism. Such mechanical link ensures proper synchronization, as the slice pushing mechanism is mechanically driven by the plunger movement, it cannot move out of synchronization.

A drawback relates to so-called top fill. Top fill is a measure for the uniformity of the slice after it has entered the first segment of the baling chamber. It will be recognized that a non-uniform fill, for example where the lower part of the first segment is more dense than an upper part, results in an inferior bale. Such top fill has an effect that a bale is highly dense at the lower end, and not dense at the top, resulting in an unstable bale that is likely to show a substantial deviation from the ideal square form. Such bale will bend like a banana resulting in a weirdly shaped bale. A negative top fill also results in a substantial wear of the plunger and baling chamber, as forces are not equally transmitted. The plunger will feel a substantially high resistance at the lower part of the plunger compared to the upper part resistance of the plunger. This will create a torque force exerted to the plunger which has to be borne by the plunger driving mechanism. When the ideal top fill can be obtained, a bale can be formed with nearly ideal outer dimensions and shape, and excessive wear on the baler mechanism can be avoided. In prior art balers, the ideal top fill is obtained by controlling the slice forming process in the pre-compression chamber. By obtaining a slice in which the crop material is evenly spread over the slice, after which the slice is pushed into the baling chamber, an acceptable top fill can be obtained.

A drawback of the existing top fill controlling mechanisms is that a deviation of the top fill can still occur depending on the baling speed and the type of crop material (hay, straw, silage, etc.).

SUMMARY OF THE INVENTION

It is an object of embodiments of the present invention to provide a baler where top fill is controllable in a more accurate manner.

In accordance with an exemplary aspect of the present invention, there is provided an agricultural baler. The agricultural baler comprises a baling chamber with a plunger that is provided to reciprocally move in the baling chamber, the baler further comprising a pre-compression chamber with a slice pushing mechanism provided for periodically pushing a slice of crop material into the baling chamber, the plunger and the slice pushing mechanism being mechanically linked via respective driving systems to ensure synchronization, wherein coupling means are mounted in the mechanical link, the coupling means being provided to adjust a synchronization timing.

In conventional balers, a mechanical connection is often provided between the plunger driving mechanism and the slice pushing driving mechanism. This mechanical connection ensures a correct synchronized movement between the plunger and the crop pushing mechanism. This prevents the crop pushing mechanism from pushing a slice of crop material into the baling chamber if the baling chamber is not ready to receive the slice of crop material (for example when the plunger is in its extended position thereby closing off the first segment of the baling chamber).

By providing a coupling means (or coupling element) in the mechanical link (or mechanical connection), the synchronization timing can be adjusted, in exemplary embodiments of the present invention. The synchronization timing can be fine-tuned, meaning that the moment of arrival of the slice of crop material into a first segment of the baling chamber can be somewhat shifted. The mechanical connection is maintained ensuring a correct synchronization (in the broad sense of synchronization) while enabling a controller to adjust the synchronization timing (thereby obtaining a fine-tuned synchronization). By controlling the moment of arrival of the slice of crop material in the baling chamber, top-fill can be influenced and thereby optimized. As a result, via the coupling element the top-fill is controllable.

Desirably, the coupling element is formed as an intermediary element linking two rotating shafts, a first one connected to a plunger driving system and a second one connected to a pushing mechanism driving system. Mechanically linking the plunger with the pre-compression chamber's pushing mechanism can be achieved via linking their respective driving systems. By providing a rotating shaft mechanically linked to the plunger driving system and providing a rotating shaft mechanically linked to the pushing mechanism driving system side, these two rotating shafts can be connected via the intermediary element. Such intermediary element provides a reliable connection and is easy to implement on an agricultural baler.

Desirably, a position of the intermediary element determines the synchronization timing. By steering the intermediary element position, the top-fill is controllable. The position can be steered manually or via an actuator or via other known mechanism. The desired position can be determined manually or automatically so that the synchronization timing can be amended and thereby the top-fill can be controlled.

Desirably, the intermediary element is movable to adjust the relative position of the two rotating shafts with respect to each other thereby adjusting the synchronization timing, more preferably the intermediary element is movable between a first position and a second position, wherein the relative angular position of the two rotating shafts with respect to each other when the intermediary element is in the first position, is different from the relative angular position of the two rotating shafts with respect to each other when the intermediary element is in the second position. By amending the relative angular position, the timing of movement of the plunger can be amended with respect to the timing of movement of the pushing mechanism. Thereby, the synchronization timing can be adjusted, and the top-fill can be controlled.

According to one embodiment, the intermediary element is formed as a planetary gearbox having an outer gear, at least two planet gears, and a central gear, whereby the plunger driving system is coupled to one of the outer gear, two planet gears and central gear, and whereby the slice pushing mechanism driving system is coupled to another of the outer gear, two planet gears, and central gear, and whereby an actuator is coupled to the yet another of the outer gear, two planet gears, and central gear to displace the latter thereby adjusting the relative position of the plunger driving system and the pushing mechanism driving system. A planetary gearbox can be used to link the plunger driving mechanism, the slice pushing mechanism driving system, and the actuator. When the actuator stands still, there is a constant predictable link between rotational speed of the plunger driving mechanism and the slice pushing mechanism driving system, meaning that the relative movement of one with respect to the other is fixed. Because of the fixed relative movement, the synchronization timing is also fixed. By operating the actuator, connected to the planetary gearbox, the relative position of the plunger driving mechanism and the slice pushing mechanism driving system changes. Thereby, synchronization optimization is made possible. A skilled person can, based on the principles explained in this disclosure, test and/or determine several planetary gearbox constructions, and can test and/or determine the influence of the actuator to the synchronization timing.

According to a second embodiment, the intermediary element has a first end being provided with a straight gear and a second end being provided with a helical gear. A two-part gearbox is formed, wherein one end is connected via a straight gear coupling and another end is connected via a helical gear coupling. Such two-part gearbox amends the relative position of two shafts while connecting the shafts in a rotational movement. When the two-part gearbox is in a fixed position, the two shafts are directly connected to one another. Rotational movement and forces can be transmitted from one shaft to another. By displacing the gearbox along its longitudinal axis, the relative position of the two shafts is amended. This is because the one end (via the straight gear coupling) remains its axial position with respect to the shaft connected to that one end, while the axial position of the second part (connected via the helical gear coupling) is changed with respect to the second shaft connected to that other end. Thereby, synchronization can be adjusted and amended synchronization timing can be obtained via such two part gearbox. A displacement of an intermediary element with the straight gear and helical gear has a result that the straight gear does not change the relative angular position with the shaft it is connected to while the helical gear does change the relative angular position with the shaft it is connected to. Thus, the relative angular position can be amended by amending the intermediary element position. By amending the relative angular position, the synchronization timing can be amended, and consequently the top-fill can be controlled.

Desirably, the intermediary element is mounted between an input gear and an output gear, wherein the input gear comprises a helical inner shape matching with the helical gear, and wherein the output gear comprises a straight inner shape matching with the straight gear, the input gear being mounted at a fixed distance with respect to the output gear, so that moving the intermediary element or input gear in the direction of its axis results in a change of rotational position of the input gear with respect to the output gear. Because the distance between the input gear and the output gear is fixed, a movement of the intermediary element results in an equal movement of that element with respect to both of the input and output gears. As a result, the helical gear will rotate the input gear with respect to the output gear, which is connected to the intermediary element via the straight gear. Thereby, relative angular position of input gear with respect to output gear can be amended, thus amending the synchronization timing, thus controlling the top-fill.

Desirably, the input gear is connected to one of the plunger driving system and the slice pushing mechanism driving system, and the output gear is connected to the other of the plunger driving system and the slice pushing mechanism driving system. Thereby, the relative angular position of plunger driving system and pushing mechanism driving system can be amended, thus amending the top-fill.

Desirably, an actuator is connected to the intermediary element or input gear for displacing the latter along its longitudinal axis thereby amending the relative angular position of the input gear with respect to the output gear. The actuator can be electrically or hydraulically powered or mechanically coupled with an external power source. The actuator allows an operator to adjust the synchronization timing from a distance. Furthermore, the actuator allows implementing a repetitive adjusting of the synchronization timing, whereby for each running cycle of the plunger or slice pushing mechanism a predetermined adjusted synchronization pattern can be obtained.

Desirably, the coupling means comprise a controlling mechanism for repetitive control of the coupling means. Also desirably, the controlling mechanism is provided for repetitive control of the intermediary element. Thereby, the predetermined adjusted synchronization pattern can be obtained. Such synchronization pattern allows adjusting the timing and moving speed of the slice pushing mechanism at predetermined sectors of a moving cycle.

Desirably, the actuator is connected to said controlling mechanism to be controllable in a repetitive movement. Such configuration allows an operator to implement and execute a repetitive synchronization adjustment.

BRIEF DESCRIPTION OF THE DRAWINGS

For the purpose of illustration, there are shown in the drawings certain embodiments of the present invention. In the drawings, like numerals indicate like elements throughout. It should be understood, however, that the invention is not limited to the precise arrangements, dimensions, and instruments shown. In the drawings.

DETAILED DESCRIPTION OF THE INVENTION

Figure 1:
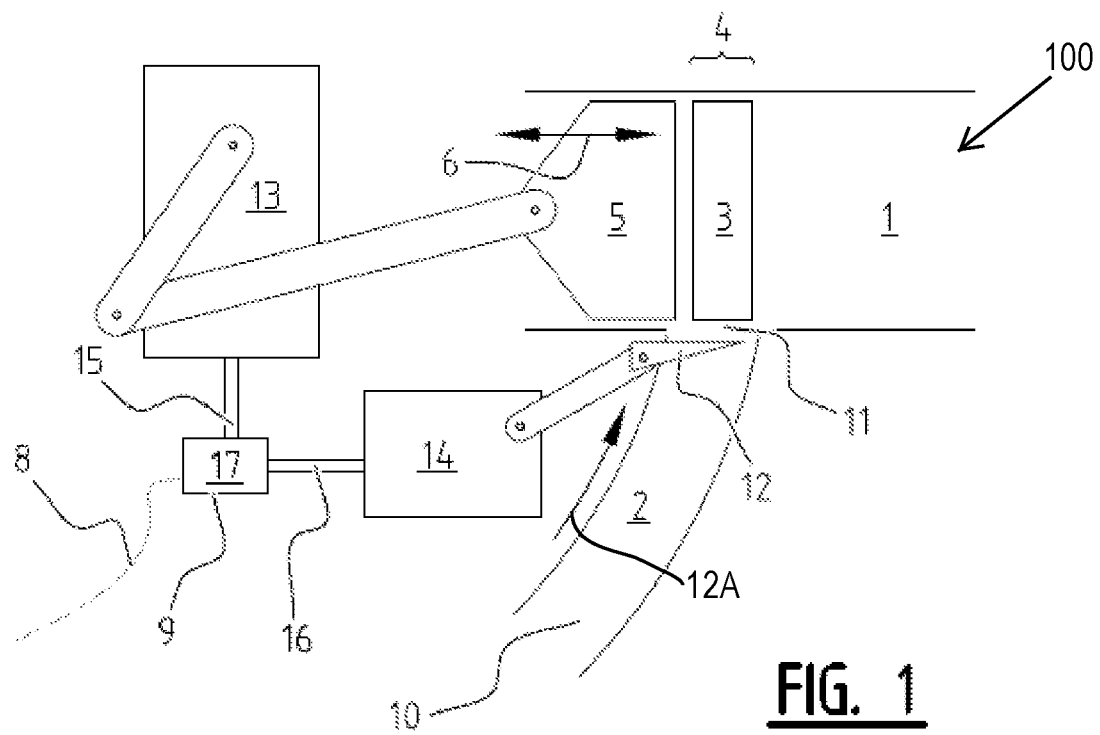
FIG. 1 shows a schematic representation of a baling chamber and a pre-compression chamber, in accordance with an exemplary embodiment of the present invention.

In the drawings a same reference number has been allocated to a same or analogous element.

FIG. 1 shows a schematic representation of main inside elements of an agricultural baler 100, in accordance with an exemplary embodiment of the present invention. FIG. 1 shows a baling chamber 1 and a pre-compression chamber 2. The pre-compression chamber 2 opens in the baling chamber 1 to push a slice of crop material 3 in a first segment 4 of the baling chamber 1.

The baling chamber comprises a plunger 5 which is provided for reciprocally moving in the baling chamber 1. The reciprocal movement is indicated by arrow 6. To this end, the plunger 5 is driven by a plunger driving mechanism 13. The connection between the plunger driving mechanism 13 and the plunger 5 is schematically represented by a pair of arms, although other driving mechanisms can be used as well for driving the plunger 5 in the reciprocal movement 6.

The pre-compression chamber 2 comprises a slice pushing mechanism 12. The slice pushing mechanism 12 is driven by a slice pushing driving mechanism 14. Desirably, the slice pushing driving mechanism 14 is mechanically connected to the plunger driving mechanism 13. Such mechanical connection ensures a synchronized movement between the plunger 5 and the slice pushing mechanism 12.

It will be clear that synchronization between the slice pushing mechanism 12 of the pre-compression chamber 2, and the reciprocal movement 6 of the plunger 5 is important for a correct operation of the baler 100. In the reciprocal movement of the plunger 5, the plunger 5 moves over at least a part of the first segment 4 of the baling chamber 1. Therefore, for being able to push a slice of crop material 3 into the baling chamber 1, the plunger 5 is desirably somewhere in a withdrawn position in the reciprocal movement 6. Otherwise, the first segment 4 is not open for receiving a slice of crop material 3.

The pre-compression chamber 2 desirably comprises an inlet 10 and an outlet 11. The outlet 11 opens toward the first segment 4 of the baling chamber 1, so that a slice of crop material 3 formed in the pre-compression chamber 2 can be pushed through the outlet 11 into the baling chamber 1. The inlet 10 of the pre-compression chamber 2 is desirably connected to crop gathering means (not shown) provided for gathering crop material and pushing the gathered crop material into the pre-compression chamber 2 via the inlet 10.

The mechanical connection between the plunger driving mechanism 13 and the slice pushing driving mechanism 14 is schematically represented by the elements 15, 16 and 17 in FIG. 1.

An important aspect in the formation of a square bale via the agricultural baler 100 is the top fill.

Figure 2:
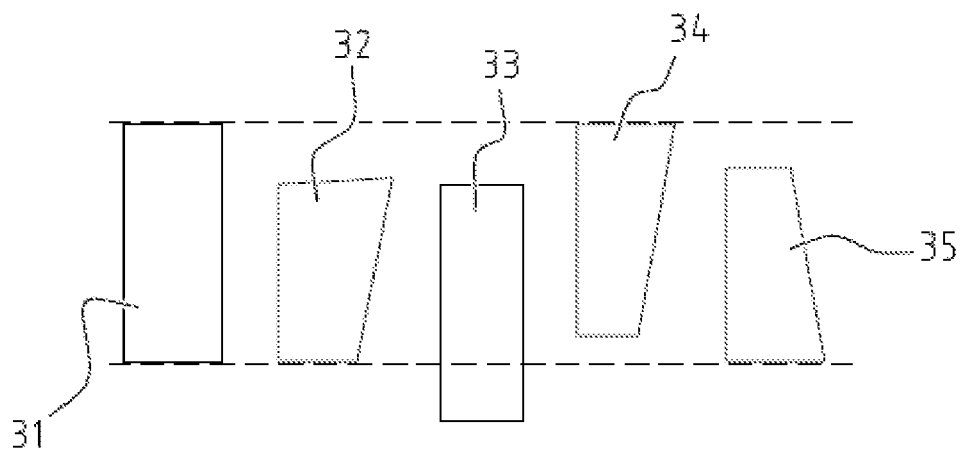
FIG. 2 shows top-fill possibilities.

FIG. 2 illustrates some possibilities regarding top fill. Top fill is defined as the distribution of crop material over the first segment 4 area at the moment that the plunger 5 hits the slice of crop material 3 in its forward movement. In an ideal situation, as is illustrated by slice 31, the crop material 3 is evenly distributed over the complete area of the first segment 4 of the baling chamber 1. However, this ideal situation cannot always be achieved. At a lower baling speed, it is possible that a slice of crop material 3 that is formed in the pre-compression chamber 2 has a density that is too low to keep the slice 3 in shape. The effect is that the slice of crop material 3 shrinks in the first segment 4 of the baling chamber 1, thereby resulting in a slice as is shown in FIG. 2 with reference number 32 or reference number 35. Pressing a bale with slices formed like that, results in an uneven distribution of load to the plunger 5 and results in bales having shapes that deviate from the ideal rectangular shape 31. In another case, a wrong synchronization between the slice pushing mechanism 12 and the plunger 5 could result in a slice 3 that is not yet completely pushed in the first segment 4 of the baling chamber 1 when the plunger 5 hits the slice 3, or has already fallen back (due to gravity) because the slice pushing mechanism 12 withdrew too early.

In such situation, a slice 3 as is shown in FIG. 2 by reference number 33 is compressed by the plunger 5. Compressing such a slice 3 again results in the above described problems. In fast working balers, another problem might arise where the slice pushing mechanism 12 pushes the slice 3 in the first segment 4 of the baling chamber 1 with such force that the slice 3 deforms because it bumps into the top wall of the baling chamber 1. Such situation results in a slice 3 as is shown in FIG. 2 with reference number 34. Again, such slice 3 results in excessive wear of the baler elements because of unbalanced load, and results in bad bales.

Figure 3:
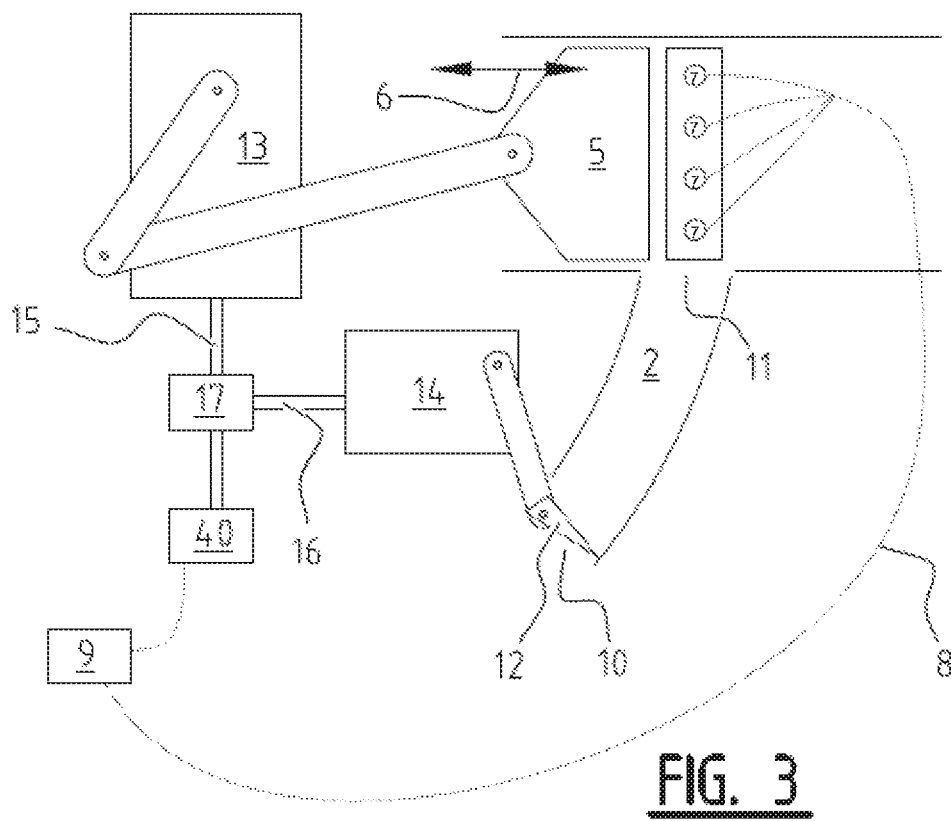
FIG. 3 shows an alternative schematic representation of a baling chamber and a pre-compression chamber, in accordance with an exemplary embodiment of the present invention.

In the example of FIG. 1, a mechanical connection is established between plunger driving mechanism 13 and the slice pushing driving mechanism 14 via respective plunger shaft 15 and slice pushing mechanism shaft 16 which are connected via a coupling means or gearbox 17. The gearbox 17 connects the two shafts 15, 16 so that the shafts 15, 16 rotate with respect to one another in a predetermined rotation ratio. For example, the rotation ratio is 2, meaning that one shaft rotates two times as fast as the other shaft. In another example, the rotation ratio is 1, meaning that the shafts 15, 16 rotate at the same speed. Other rotation ratios are possible. The gearbox 17 is furthermore adapted for adjusting the rotation ratio between the plunger shaft 15 and the slice pushing mechanism shaft 16, thereby adjusting synchronization between reciprocal plunger movement 6 and the slice pushing movement 12A of the pre-compression chamber 2. The controller 9 is adapted to control the gearbox 17 based on an input 8. Different sorts of inputs 8 exist that are suitable for controlling the controller 9. An operator of the baler 100 can provide an input 8 manually based on visual observations or measurements executed on produced bales. After examining the produced bales, an operator can adjust synchronization based on experience and provide the corresponding input 8 to the controller 9. Other input 8 mechanisms include sensors 7, of which FIG. 3 shows an example. The sensors 7 can be placed at different places inside the baler 100 and provided for measuring different parameters. These parameters can be used, in an example, by a microprocessor to control the controller 9, thereby amending synchronization.

Figure 4:
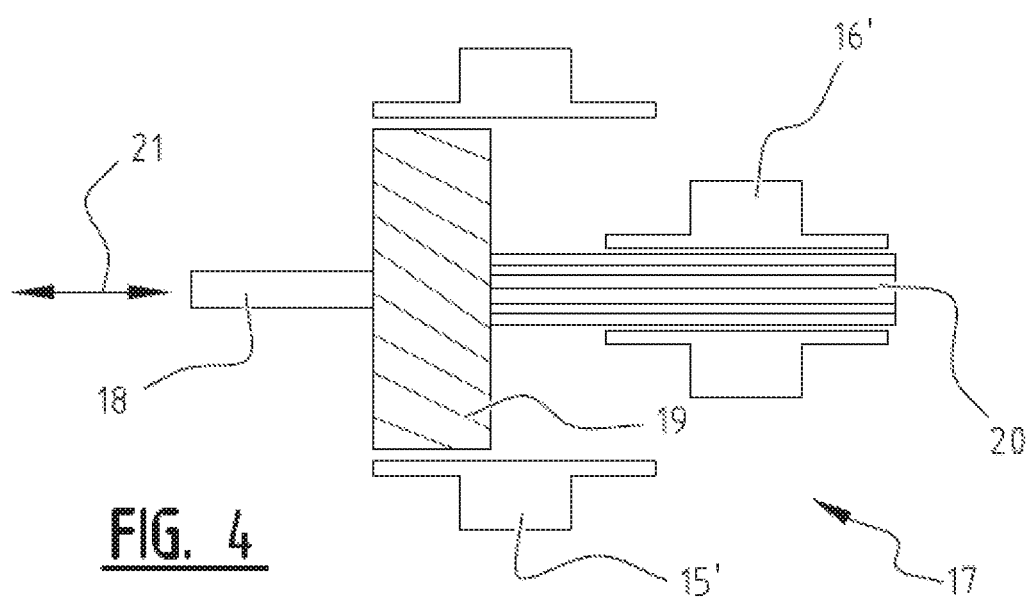
FIG. 4 shows a gearbox suitable for coupling a movement of the baling chamber and a movement of the pre-compression chamber of FIG. 1, in accordance with an exemplary embodiment of the present invention.

FIG. 4 shows an example of a gearbox 17 that is suitable for adjusting synchronization between a first and a second rotating shaft, in accordance with an exemplary embodiment of the present invention. The gearbox 17 comprises helical input gear 15' and a straight output gear 16'. In the example of FIG. 4 and FIG. 1, the helical input gear 15' is coupled to the plunger shaft 15 and the straight output gear 16' is coupled to the slice pushing mechanism shaft 16. The input gear 15' and output gear 16' are mounted in a frame (not shown) such that the distance between input gear 15' and output gear 16' is fixed. The input gear 15' and output gear 16' are connected via an intermediary gear element 18 showing two parts. A first part comprises a helical gear 19 complementary to the helical input gear 15', and the second part shows a straight gear 20 complementary with the straight output gear 16'. Thereby, in a non-moving position, the intermediary gear element 18 transmits the rotation of the input shaft 15 connected to the input gear 15' directly in a one-to-one ratio to the output shaft 16 connected to the output gear 16'. The first part 19 and the second part 20 of the intermediary gear element 18 are desirably integrally formed in such a matter that one end of the intermediary gear element 18 comprises the helical gear 19 and the opposite end comprises the straight gear 20. The helical gear 19 and the straight gear 20 are formed around a single longitudinal axis 21 of the intermediary gear element 18. Desirably, the helical gear 19 diameter is larger than the straight gear 20 diameter. More desirably, the helical gear 19 diameter is larger than two times the straight gear 20 diameter.

The intermediary gear element 18 is provided to move along its longitudinal axis 21 between a first and a second position. In FIG. 4, the intermediary gear element 18 is shown in its most leftward position, and can be shifted to the right. By moving the intermediary gear element 18 along its longitudinal axis 21, the relative position of the input gear 15' and the output gear 16' changes. Thereby, synchronization between the input gear 15' and output gear 16' respectively coupled to the plunger driving mechanism 13 and the slice pushing driving mechanism 14 can be amended and fine-tuned while maintaining an overall synchronization (as the shafts are mechanically coupled). Such fine-tuning is achieved by moving the intermediary gear element 18 along its longitudinal axis 21. Such movement is indicated in FIG. 4 by the arrows on longitudinal axis 21. In a situation with a non-moving intermediary element, the rotation ratio between input gear 15' and output gear 16' is fixed to a 1 on 1 ratio. By moving the intermediary gear element 18 along its longitudinal axis, a rotation of the input gear 15' with respect to the output gear 16' is induced, which has as a result that the rotation ratio, at least during movement of the intermediary gear element 18, deviates from the fixed 1 on 1 ratio. Thereby, synchronization timing is adjusted.

Adjustment of synchronization timing can be directly and positively verified by an easy test. By placing a mark at the outer surface of each of the input shaft 15 and output shaft 16 (the mark being for example in the form of a white dot), rotation of the shafts 15, 16 can be visualized in the form of pulses. Each time the dot passes a predetermined location, a pulse is generated. As an example, this can be measured via an optical sensor and be visualized on a screen. A first measurement is conducted when the coupling means 17 are in a first status. A second measurement is conducted when the coupling means 17 are in a second status (for example when the intermediary gear element 18 is moved). If the visualized rotations show a different pattern (different rotation ratio or shifted timing of rotation of one shaft with respect to the other shaft), the synchronization timing is adjusted.

Alternatively to the gearbox 17 as shown in FIG. 4, the gearbox 17 may be embodied as a planetary gearbox for adjusting synchronization timing between the plunger shaft 15 and the slice pushing driving mechanism shaft 16, in accordance with an exemplary embodiment of the present invention. A planetary gearbox connects three shafts. The center wheel, the ring wheel, and the planetary wheels form the shaft connecting elements. Thereby, the plunger shaft 15 and slice pushing driving mechanism shaft 16 can each be connected to one of the three gear elements of the planetary gearbox. A controller can be connected to the third gear of the planetary gearbox. The gearbox can be so configured that a standing still controller results in a ratio between input shaft speed and output shaft speed (in the present case the plunger shaft 15 and slice pushing driving mechanism shaft 16) that is fixed and predetermined so that synchronization is achieved. A rotation of the controller, rotating the third gear of the planetary gearbox, amends the relative position of the input shaft and output shaft, thereby adjusting the synchronization. A skilled person, given the information above, can configure a planetary gearbox in different manners to serve the purpose of the present invention.

By adjusting synchronization between the reciprocal plunger movement 6 and the slice pushing movement 12A of the slice pushing mechanism 12, the timing of insertion of a slice 3 with respect to the plunger movement 6 can be adjusted and thereby optimized. Also the speed of pushing the slice into the first segment 4 of the baling chamber 1 can be adjusted and optimized.

Figure 5:
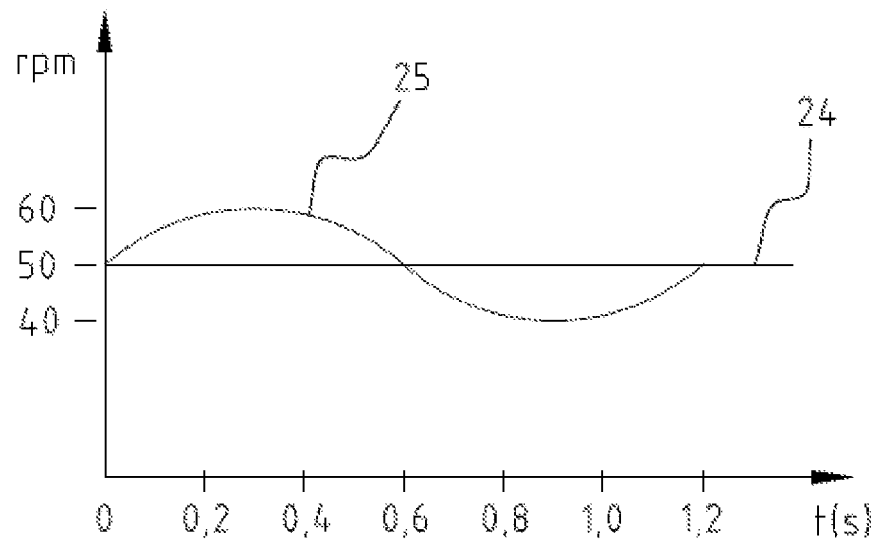
FIG. 5 shows an influence of a gearbox in the movement of the elements of the pre-compression chamber of FIG. 1, in accordance with an exemplary embodiment of the present invention.
Figure 5:
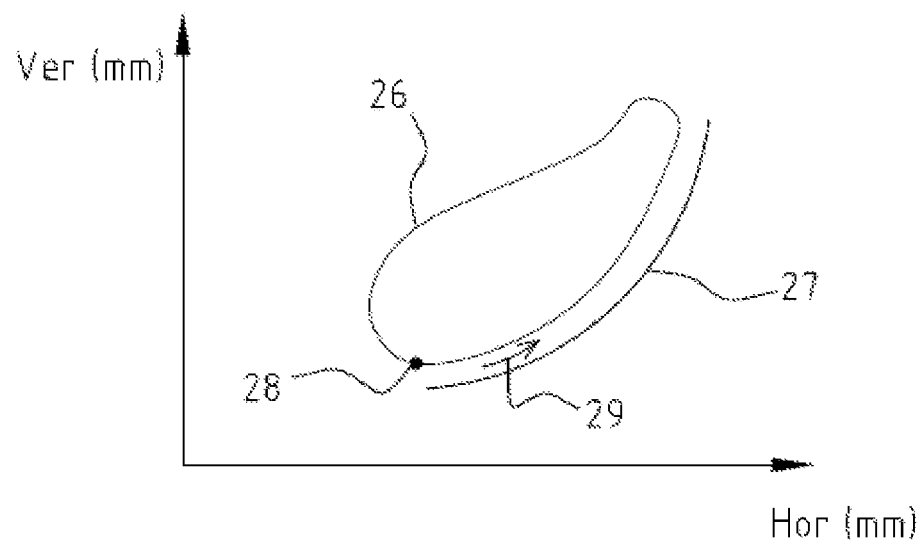

FIG. 5 shows two graphical representations of the slice pushing movement 12A. The lower graph shows the movement that the slice pushing mechanism 12 tip makes in time, and shows on the horizontal axis the horizontal movement in millimeters and on the vertical axis the vertical movement in millimeters. Starting at point 28, the tip is displaced in the direction indicated by arrow 29 and grasps behind the slice 3 to push the slice 3 through the outlet 11 into the baling chamber 1. The pushing movement is indicated by reference number 27. In the rest of the movement 26, the tip withdraws, and in the withdrawn position, moves back to the starting point 28 where the tip can push a new slice 3 in a subsequent period. The upper part of FIG. 5 shows the transmission of rotational movement between the plunger shaft 15 and the slice pushing mechanism shaft 16 over the time. In the figure, as an example, the slice pushing period takes 1.2 seconds, meaning that every 1.2 second a new slice of crop material is pushed into the baling chamber 1. Using a fixed connection between the plunger shaft 15 and the slice pushing mechanism shaft 16, a rotation is transmitted from one to the other shaft in a flat manner as is indicated by reference number 24. This rotation results in a slice pushing mechanism 12 tip moving along the path 26 with a constant speed (constant speed meaning that in every period, in every sub-segment of the movement, the tip follows the path with an identical distance over time ratio). Thereby, the speed of the segment 27 of the path of movement 26 cannot be adjusted. Using a gearbox as described above to connect the plunger shaft 15 and the slice pushing driving mechanism shaft 16, the synchronization can be adjusted. An example of an adjusted synchronization is indicated with reference number 25. In this example, the first part of the period is speeded up with respect to the second part of the period. Thereby, the slice pushing mechanism 12 tip moves faster over the segment 27 of the movement path 26 than over the rest of the movement path. As a result, the timing of arrival of the slice 3 in the first segment 4 of the baling chamber 1 is adjusted.

Desirably, the gearbox 17 comprises an actuator 40 that is steerable via the controller 9. The controller 9 is operationally connected to input means such as a slice presence detecting sensor 7. The actuator 40 is desirably coupled to the gearbox 17 in such a manner that the relative position of the plunger shaft 15 with respect to the slice pushing driving mechanism shaft 16 is adjustable. In the example of the gearbox of FIG. 4, the actuator is coupled to the intermediary gear element to move the intermediary gear element along it longitudinal axis. In the example of the planetary gearbox, the actuator is coupled to the third of the three gear elements, so that a rotation of the actuator changes the relative position of the plunger shaft 15 (connected to a first of the three gear elements) and the slice pushing driving mechanism shaft 16 (connected to a second of the three gear elements). The actuator is steerable by the controller, which thereby controls the relative position of the plunger shaft 15 with respect to the slice pushing driving mechanism shaft 16.

The controller 9 comprises a manual input means, an electrical circuit, or an electronic circuit, or a programmable electronic circuit or a combination of the above, so that the controller can control the actuator 40 based on one or more input signals. The controller can comprise an open control loop, or a closed control loop, or a control loop comprising feed forward control commands, or a combination of the above.

In an exemplary embodiment, the input 8 is formed by a sensor 7 that is placed in the first segment 4 of the baling chamber 1. The sensor 7 is adapted to measure a presence of a slice 3 in the first segment 4 of the baling chamber 1. Therefore, this sensor 7 is referred to as slice presence detecting sensor. Such slice presence detecting sensor 7 can be formed in different manners such as ultrasonic sensor, infrared sensor, contact sensor, optical sensor or other known sensors. Desirably, the slice presence detecting sensor 7 is formed as a force sensor adapted to measure a contact force. With such force sensor, not only the presence of the slice 3 can be measured, but also the force with which the slice arrives 3 at the sensor 7 can be measured. Such force can be indicative for slice 3 deformation (a slice 3 arriving at the sensor 7 with a high force undergoes a high acceleration which can result in a deformation of the slice 3).

The slice presence detecting sensor 7 is in an example operationally coupled 8 to a controller 9. The controller 9 is adapted to adjust synchronization between the reciprocal plunger movement 6 and the slice pushing movement 12A of the pre-compression chamber 2.

FIG. 3 shows an alternative configuration of a baling chamber 1 and a pre-compression chamber 2, in accordance with an exemplary embodiment of the present invention. In the example of FIG. 3, multiple slice presence detecting sensors 7 are provided in the first segment 4 of the baling chamber 1, each of the sensors 7 being mounted at a different height in the first segment 4 of the baling chamber 1. The slice presence detecting sensors 7 are desirably mounted in at least one of the side walls of the baling chamber 1. Having multiple slice presence detecting sensors at different heights in the first segment 4 of the baling chamber 1 allows deducing not only an arrival of the slice 3, but also a speed of the slice 3, and where at least three sensors 7 are provided, an acceleration or deceleration of the slice 3 in the first segment 4 of the baling chamber 1. This speed and acceleration/deceleration information can be further used by the controller 9 to adjust the synchronization between the reciprocal movement of the plunger 5 and the slice pushing in the pre-compression chamber 2.

FIG. 3 also shows a gearbox 17 having 3 inputs being the plunger shaft 15, the slice pushing mechanism shaft 16, and an actuator 40 shaft. As described above, the actuator 40 shaft is controlled by the controller 9 and is provided to adjust synchronization timing between the plunger shaft 15 and the slice pushing mechanism shaft 16.

It will be clear that different combination can be made of baler elements which examples are given in the present description. Also alternative gearboxes could be developed based on the principles disclosed in this document which allow adjusting synchronization timing.

In the above description, different embodiments have been described that allow adjusting the timing of arrival of a slice in the first segment 4 of the baling chamber 1. By adjusting the timing, referring back to FIG. 2, situations as indicated by reference number 33 can be avoided. Furthermore, deviation of the slice with respect to the ideal shape 31 (deviation such as indicated with reference number 32, 34 and 35) can be minimized. Adjusting the synchronization between the reciprocal plunger movement 6 and the slice pushing movement 12A of the pre-compression chamber 2 implies that at least one of the slice pushing speed and slice pushing timing is controllable and can be amended.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural baler comprising:
   a baling chamber;
   a plunger configured for reciprocally moving in the baling chamber;
   a first drive that is drivingly linked to the plunger;
   a pre-compression chamber comprising a stuffer oriented for pushing a slice of crop material into the baling chamber;
   a second drive in driving connection with the stuffer, the first drive and the second drive being linked by a mechanical link to ensure synchronization;
   a first rotating shaft connected to the first drive;
   a second rotating shaft connected to the second drive; and
   a gearbox comprising an intermediary element linking the first and second rotating shafts, the gearbox mounted in the mechanical link wherein the gearbox is provided to adjust a synchronization timing between a position of the plunger and a position of the stuffer, the intermediary element movable between a first position and a second position, the first and second rotating shafts having a relative angular position with respect to each other,
   wherein the relative angular position of the first and second shafts when the intermediary element is in the first position is different from the relative angular position of the first and second rotating shafts when the intermediary element is in the second position.

2. The agricultural baler of claim 1, wherein a position of the intermediary element determines the synchronization timing.

3. The agricultural baler of claim 1, wherein the intermediary element is movable to adjust the relative position of the first and second rotating shafts, thereby adjusting the synchronization timing.

4. An agricultural baler comprising:
   a baling chamber;
   a plunger configured for reciprocally moving in the baling chamber;
   a first drive that is drivingly linked to the plunger;
   a pre-compression chamber comprising a stuffer oriented for pushing a slice of crop material into the baling chamber;
   a second drive in driving connection with the stuffer, the first drive and the second drive being linked by a mechanical link to ensure synchronization;
   a first rotating shaft connected to the first drive;
   a second rotating shaft connected to the second drive;
   a coupling comprising an intermediary element linking the first and second rotating shafts, the coupling forming a portion of the mechanical link, wherein the coupling is provided to adjust a synchronization timing between a position of the plunger and a position of the stuffer, the intermediary element movable between a first position and a second position, the first and second rotating shafts having a relative angular position with respect to each other, wherein the relative angular position of the first and second shafts when the intermediary element is in the first position is different from the relative angular position of the first and second rotating shafts when the intermediary element is in the second position; and
   an actuator, wherein the intermediary element is a planetary gearbox, wherein the first drive is coupled to the planetary gearbox, wherein the second drive is coupled to the planetary gearbox, and wherein the actuator is coupled to the planetary gearbox, thereby adjusting a relative position of the first drive and the second drive.

5. An agricultural baler comprising:
   a baling chamber;
   a plunger configured for reciprocally moving in the baling chamber;
   a first drive that is drivingly linked to the plunger;
   a pre-compression chamber comprising a stuffer oriented for pushing a slice of crop material into the baling chamber;
   a second drive in driving connection with the stuffer, the first drive and the second drive being linked by a mechanical link to ensure synchronization;
   a first rotating shaft connected to the first drive;
   a second rotating shaft connected to the second drive; and
   a coupling comprising an intermediary element linking the first and second rotating shafts, the coupling forming a portion of the mechanical link, wherein the coupling is provided to adjust a synchronization timing between a position of the plunger and a position of the stuffer, the intermediary element movable between a first position and a second position, the first and second rotating shafts having a relative angular position with respect to each other,
   wherein the relative angular position of the first and second shafts when the intermediary element is in the first position is different from the relative angular position of the first and second rotating shafts when the intermediary element is in the second position,
   wherein the intermediary element has a first end being provided with a straight gear and a second end being provided with a helical gear.

6. The agricultural baler of claim 5, wherein the coupling further comprises an input gear and an output gear, wherein the intermediary element is mounted between the input gear and the output gear, wherein the input gear comprises a helical inner shape matching with the helical gear, and wherein the output gear comprises a straight inner shape matching with the straight gear, the input gear being mounted at a fixed distance with respect to the output gear so that moving the intermediary element or input gear in the direction of its axis results in a change of rotational position of the input gear with respect to the output gear.

7. The agricultural baler of claim 6, wherein the input gear is connected to one of the first drive and the second drive, and wherein the output gear is connected to the other of the first drive and the second drive.

8. The agricultural baler of claim 5, further comprising an actuator connected to the intermediary element or input gear for displacing the latter along its longitudinal axis, thereby amending a relative angular position of the input gear with respect to the output gear.

9. The agricultural baler of claim 1, further comprising a controller and an actuator connected to the controller, and the controller is configured for steering the actuator for repetitive control of the gearbox.

10. An agricultural baler comprising:
    a baling chamber;

a plunger configured for reciprocally moving in the baling chamber;

a plunger drive in driving connection with the plunger;

a pre-compression chamber comprising a stuffer configured for periodically pushing a slice of crop material into the baling chamber;

a stuffer drive in driving connection with the stuffer;

a mechanical link linking the plunger drive and the stuffer drive, the mechanical link comprising:

a first rotating shaft connected to the plunger drive;

a second rotating shaft connected to the stuffer drive, the first and second rotating shafts having a relative angular position with respect to each other; and a gearbox comprising an intermediary element linking the first and second rotating shafts and configured for adjusting a synchronization timing of a position of the plunger and a position of the stuffer, the intermediary element movable between a first position and a second position, wherein the relative angular position of the first and second shafts when the intermediary element is in the first position is different from the relative angular position of the first and second rotating shafts when the intermediary element is in the second position.

11. The agricultural baler of claim 10, wherein a position of the intermediary element determines the synchronization timing.

12. The agricultural baler of claim 10, wherein the intermediary element is movable to adjust the relative position of the first and second rotating shafts, thereby adjusting the synchronization timing.

13. An agricultural baler comprising:

a baling chamber;

a plunger configured for reciprocally moving in the baling chamber;

a plunger drive in driving connection with the plunger;

a pre-compression chamber comprising a stuffer configured for periodically pushing a slice of crop material into the baling chamber;

a stuffer drive in driving connection with the stuffer;

a mechanical link linking the plunger drive and the stuffer drive to permit the synchronization of the plunger and the stuffer, the mechanical link comprising:

a first rotating shaft connected to the plunger drive;

a second rotating shaft connected to the stuffer drive, the first and second rotating shafts having a relative angular position with respect to each other; and an intermediary element linking the first and second rotating shafts and configured for adjusting a synchronization timing of a position of the plunger and a position of the stuffer, the intermediary element movable between a first position and a second position, wherein the relative angular position of the first and second shafts when the intermediary element is in the first position is different from the relative angular position of the first and second rotating shafts when the intermediary element is in the second position;

an actuator, wherein the intermediary element is a planetary gearbox, wherein the plunger drive is coupled to the planetary gearbox, wherein the stuffer drive is coupled to the planetary gearbox, and wherein the actuator is coupled to the planetary gearbox, thereby adjusting a relative position of the plunger drive and the stuffer drive.

14. An agricultural baler comprising:

a baling chamber;

a plunger configured for reciprocally moving in the baling chamber;

a plunger drive in driving connection with the plunger;

a pre-compression chamber comprising a stuffer configured for periodically pushing a slice of crop material into the baling chamber;

a stuffer drive in driving connection with the stuffer;

a mechanical link linking the plunger drive and the stuffer drive to permit the synchronization of the plunger and the stuffer, the mechanical link comprising:

a first rotating shaft connected to the plunger drive;

a second rotating shaft connected to the stuffer drive, the first and second rotating shafts having a relative angular position with respect to each other; and an intermediary element linking the first and second rotating shafts and configured for adjusting a synchronization timing of a position of the plunger and a position of the stuffer, the intermediary element movable between a first position and a second position, wherein the relative angular position of the first and second shafts when the intermediary element is in the first position is different from the relative angular position of the first and second rotating shafts when the intermediary element is in the second position;

wherein the intermediary element has a first end being provided with a straight gear and a second end being provided with a helical gear.

15. The agricultural baler of claim 14, wherein the intermediary element further comprises an input gear and an output gear, wherein the intermediary element is mounted between the input gear and the output gear, wherein the input gear comprises a helical inner shape matching with the helical gear, and wherein the output gear comprises a straight inner shape matching with the straight gear, the input gear being mounted at a fixed distance with respect to the output gear so that moving the intermediary element or input gear in the direction of its axis results in a change of rotational position of the input gear with respect to the output gear.

16. The agricultural baler of claim 15, wherein the input gear is connected to one of the plunger drive and the stuffer drive, and wherein the output gear is connected to another of the plunger drive and the stuffer drive.

17. The agricultural baler of claim 14, further comprising an actuator connected to the intermediary element or input gear for displacing the latter along its longitudinal axis, thereby amending a relative angular position of the input gear with respect to the output gear.

18. The agricultural baler of claim 10, further comprising a controller and an actuator connected to the controller, and the controller is configured for steering the actuator for repetitive control of the gearbox.

\* \* \* \* \*